Aug. 13, 1929.  C. T. SMALL  1,724,113
HOPPER FOR FILLING MACHINES
Original Filed Feb. 17, 1926  2 Sheets-Sheet 1

Inventor
C. T. Small
By E. E. Huffman
Att'y.

Aug. 13, 1929.                  C. T. SMALL                    1,724,113
                          HOPPER FOR FILLING MACHINES
                  Original Filed Feb. 17, 1926      2 Sheets-Sheet 2
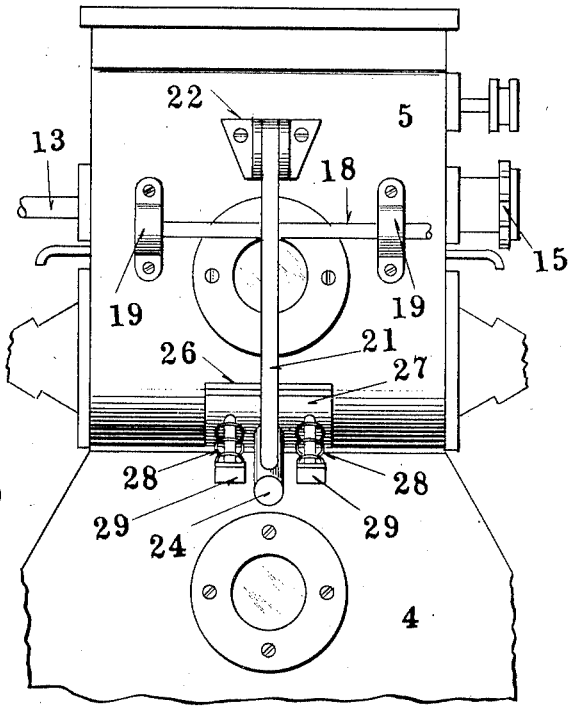
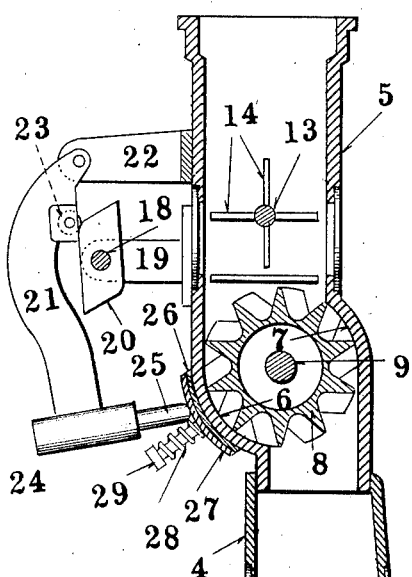
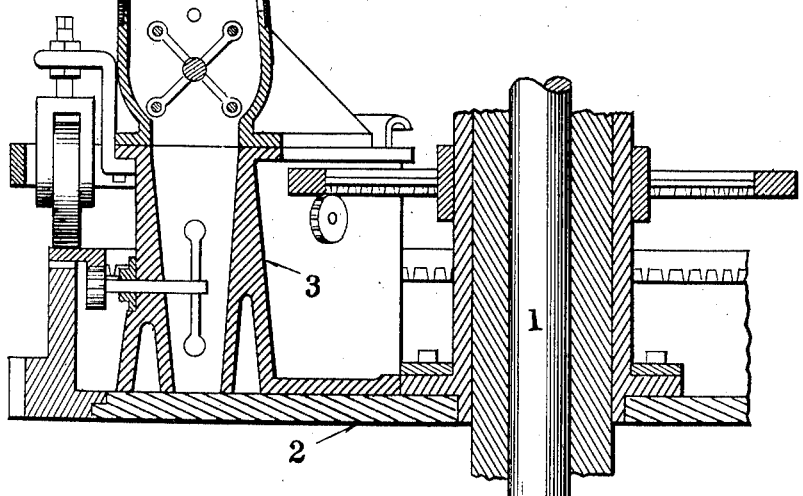
Inventor
C. T. Small
By E. E. Huffman
Att'y.

Patented Aug. 13, 1929.

1,724,113

UNITED STATES PATENT OFFICE.

CHESLEY T. SMALL, OF ST. LOUIS, MISSOURI.

HOPPER FOR FILLING MACHINES.

Original application filed February 17, 1926, Serial No. 88,765. Divided and this application filed February 1, 1928. Serial No. 251,020.

My invention relates to a hopper for filling machines and is a division of application Serial No. 88,765 filed by me February 17, 1926. Specifically, my invention consists in improved means for controlling the flow of material through the hopper by means of a helical feed reel and to means for preventing the adhesion of material to the feed reel and the walls of the hopper.

Figure 1:
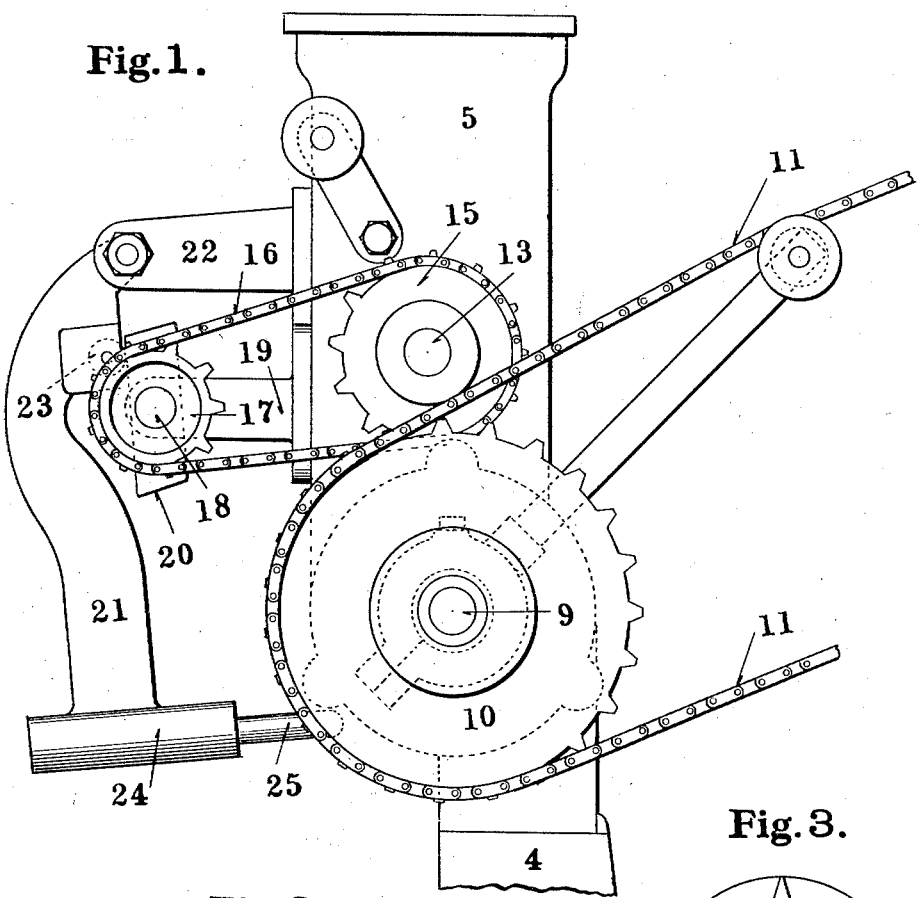
Figure 2:
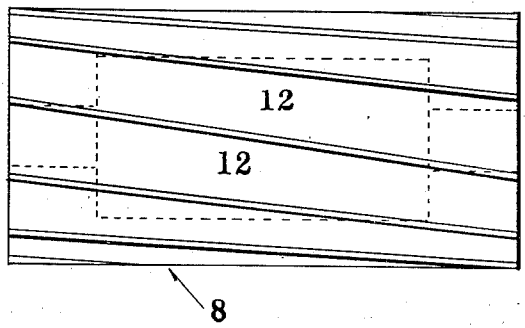
Figure 3:
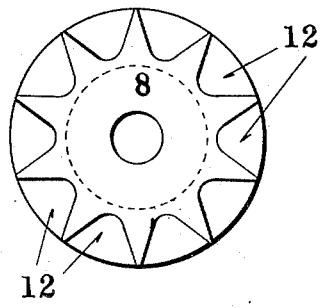

In the accompanying drawings, which illustrate one form of hopper made in accordance with my invention, Figure 1 is a side elevation; Figure 2 is a side view of the feed reel; Figure 3 is an end view of the feed reel; Figure 4 is a vertical section; and Figure 5 is a rear view.

Referring first to Figure 4, 1 indicates the central shaft of a filling machine on which is mounted a rotary disk 2 and a stationary main or filling hopper 3. Secured to the top of the filling hopper is a distributing hopper 4. All of these parts are fully described in the application of which this is a division and will not be now described in detail.

Connected to the upper end of the distributing hopper is a feed hopper 5 offset near its lower end to provide diametrically opposed concaves 6 and 7 contacting with the periphery of a feed reel 8 on a shaft 9. Mounted on one end of the shaft 9 is a sprocket wheel 10 around which passes a sprocket chain 11 leading to a variable speed mechanism (not shown). Formed in the periphery of the feed reel are a number of flutes or grooves 12 V-shaped in cross section with rounded bottoms. This shape reduces to a minimum the tendency of the material to pack in the grooves. The grooves do not extend straight across the face of the reel but are helical in form so that the contents of each groove, instead of being dropped en masse, and so producing a rhythmic pulsation or flutter in the distributing chamber, are discharged progressively from end to end producing a substantially continuous flow. The pitch of the grooves, however, must not be so great that one end of a groove will communicate with the space above the cooperating concave while the other end communicates with the space below the concave; otherwise more or less material would flow from the upper to the lower space independent of the rotation of the reel and consequently the accuracy of feed would be lost. In case the distributing hopper 4 becomes filled with material the flutes will pick up the surplus material and return it to the space above the concaves. This returning function is facilitated by the offset form of the feed hopper.

In the feed hopper above the reel is an agitator shaft 13 provided with stirring arms 14. On the shaft 13 is a sprocket wheel 15 around which passes a sprocket chain 16 also passing around a sprocket wheel 17 on a shaft 18 carried in brackets 19 on the hopper. Mounted on the shaft 18 is cam 20 contacting with a hammer arm 21 pivoted to a bracket 22. The arm is preferably provided at its point of contact with the cam with an anti-friction roller 23. Carried by the hammer arm is a head 24 in which is set a striking pin 25, preferably of hard wood. The action of the cam is to alternately raise the hammer arm and allow it to drop so that the pin 25 will strike the wall of the feed hopper adjacent to the reel and preferably at the lower concave 6. This tapping or jarring of the hopper will loosen any material becoming packed in or adhering to the grooves of the reel or the walls of the hopper. I have found that this constant hammering, if applied directly to the walls of the hopper, is injurious to the machine. I therefore interpose a cushioning device comprising a bottom strip 26 of leather, rubber or similar soft material, and a top strip 27 of metal, against which the pin strikes. These strips are yieldingly held in position by coil springs 28 surrounding bolts 29 passing through the strips and threaded into the wall of the hopper, thus taking up the rebound of the strip or plate against which the hammer strikes.

Having fully described my invention, what I claim as new and desire to secure by Letters Patent of the United States is:

1. In a device of the class described, the combination with a feed chamber having a pair of opposed concave faces, of a feed reel in said chamber and contacting with said concave faces, said feed reel having helical grooves in the periphery for transferring material from the space above to the space below said concaves.

2. In a device of the class described, the combination with a feed chamber having a pair of opposed concave faces, of a feed reel in said chamber and contacting with said concave faces, said feed reel having helical grooves in the periphery for transferring material from the space above to the space below said concaves, the pitch and width of the grooves being so proportioned with relation to the concaves that each groove may be completely closed by one of the concaves.

3. In a device of the class described, the combination with a feed chamber having a pair of opposed concave faces, one of said faces terminating in an upwardly projecting perpendicular wall tangent to its curve, the other of said faces terminating in a downwardly projecting perpendicular wall tangent to its curve, a grooved feed reel contacting with said faces, and means for driving said reel to transfer material from the space above to the space below said concave faces.

4. In a device of the class described, the combination with a feed chamber, of a feed reel in said chamber, a tappet for dislodging material adhering to the reel, and a resilient contact device for said tappet.

5. In a device of the class described, the combination with a feed chamber, of a feed reel in said chamber, a tappet for dislodging material adhering to the reel, and a resilient contact device for said tappet, said contact device comprising a layer of yielding material and a metallic cover.

6. In a device of the class described, the combination with a feed chamber, of a feed reel in said chamber, a tappet for dislodging material adhering to the reel, and a resilient contact device for said tappet, said contact device comprising a layer of yielding material and a spring-pressed metallic cover.

7. In a device of the class described, the combination with a feed hopper, of a feed reel in said hopper, a resilient contact device carried by said hopper adjacent to said reel, a hammer, and a non-metallic striking pin carried by said hammer for striking said contact device.

8. In a device of the class described, the combination with a feed hopper, of a feed reel in said hopper, a resilient contact device carried by said hopper adjacent to said reel, an agitator shaft in said hopper above said feed reel, a hammer arm, a cam for actuating said hammer arm, and connections between said agitator shaft and cam for actuating the latter.

9. In a device of the class described, the combination with a feed hopper having a pair of opposed concave faces, of a feed reel in said hopper contacting with said concave faces, said feed reel having in its periphery grooves with inclined sides connected by a curved bottom, and a tappet striking said hopper adjacent to the feed reel.

10. In a device of the class described, the combination with a feed hopper having a pair of opposed concave faces, of a feed reel in said hopper contacting with said concave faces, said feed reel having helical grooves in its periphery, each of said grooves being V-shaped in cross section with a curved bottom connecting the inclined sides.

In testimony whereof, I hereunto affix my signature, this 26th day of January, 1928.

CHESLEY T. SMALL.